Aug. 12, 1941.　　　K. NÜCHTERLEIN　　　2,252,640
REFLEX CAMERA
Filed Jan. 23, 1940　　　2 Sheets-Sheet 1
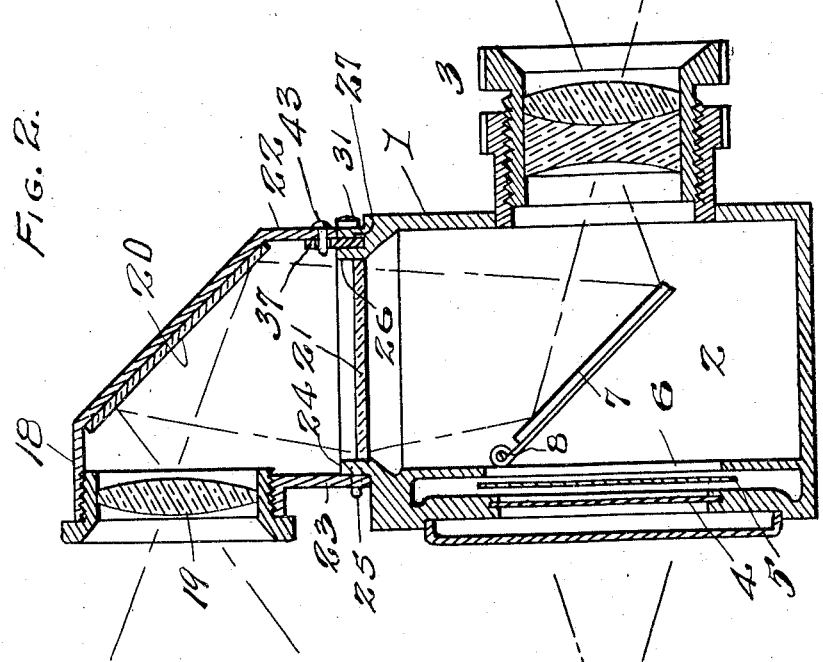
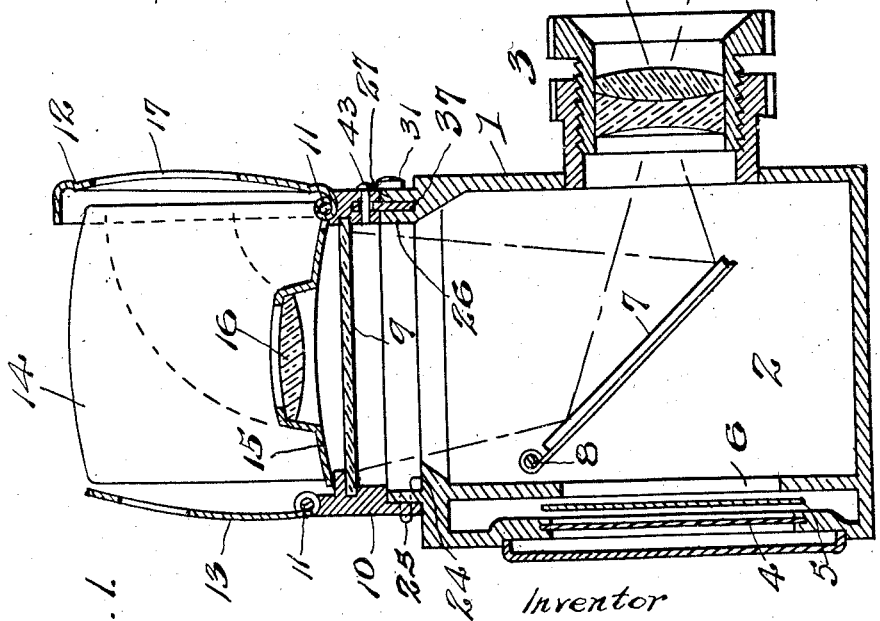
Inventor
KARL NÜCHTERLEIN
By Chas. K. Davies + Son
Attys.

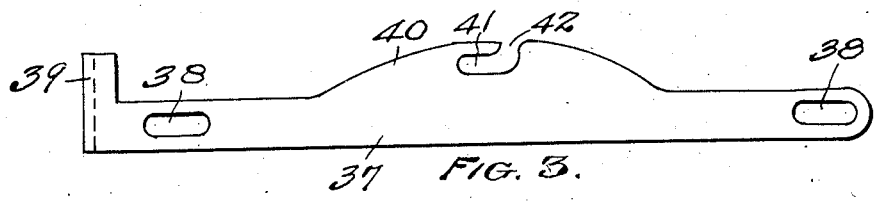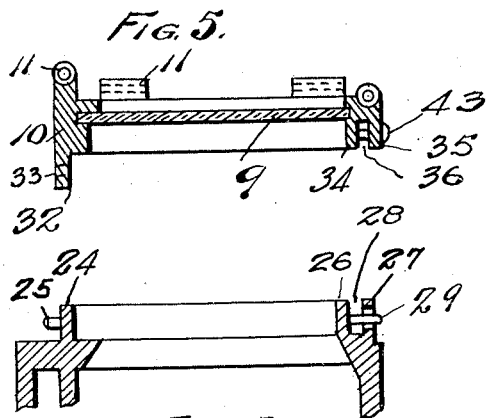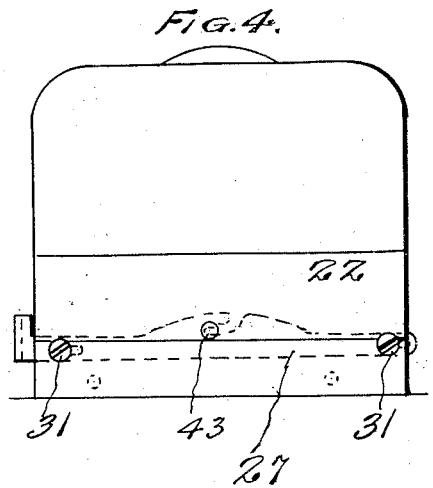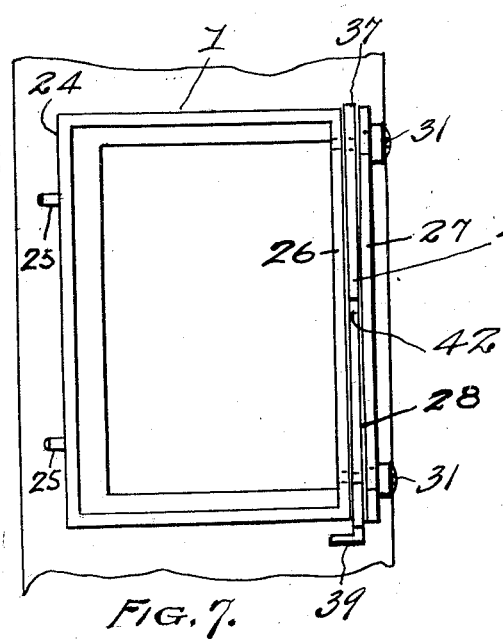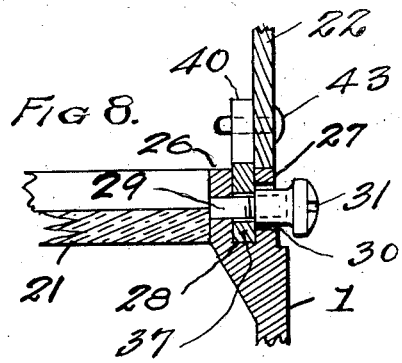

Patented Aug. 12, 1941

2,252,640

UNITED STATES PATENT OFFICE 2,252,640

REFLEX CAMERA

Karl Nüchterlein, Dresden, Germany

Application January 23, 1940, Serial No. 315,261
In Germany July 18, 1939

1 Claim. (Cl. 95—42)

The present invention relates to improvements in reflex cameras and particularly to means for interchanging and attaching different types of focusing hoods to the camera. The invention contemplates the combination with a camera body having special attaching members, of two, three, or more detachable focusing hoods each of which is fashioned with attaching means complementary to the attaching means of the camera, together with a readily releasable locking device co-acting with the complementary attaching members of the hood and the camera body.

As is well known in the art of photography, the pictures to be taken by the camera are viewed and focused in various ways, and under various light conditions to produce the clearest images on the focusing screen, and the best results in the final picture. In some instances the photographer holds his camera in position so that he looks down upon a horizontal finder-lens in one hood; in another hood the finder-lens is held up in front of the face so that one eye is employed to look into a finder-lens that is disposed in a plane perpendicular to the optical axis of the camera; and other hoods are provided with light measuring and indicating devices. As an example of the utility of the present invention three hoods of the above indicated type are interchangeable for use with a single camera, thus enabling the photographer to accomplish with a single camera the same results that would otherwise require the services of three cameras.

For convenience of illustration two different types of hoods are herein disclosed, one a foldable hood, and the other a non-folding hood.

The invention is particularly adapted for use with a roll-film, focal shutter, reflex camera, in which the shutter, comprising two automatically operating curtains, is located in front of the film, and both the film and shutter are advanced through a dark chamber at the rear of a light chamber.

The primary object of the invention is the provision of means whereby such focusing hoods as heretofore referred to, may with facility and convenience be attached to and detached from the camera body, and means are employed for securely locking the selected hood in focusing position on the camera. Thus by interchanging the hoods, one and the same camera may be converted and employed for various purposes, thereby broadening and extending the functions of a single camera, in lieu of the use of two or more cameras.

In the accompanying drawings one complete example of the physical embodiment of the invention, together with a slightly modified form, is illustrated, but it will be understood that various changes and alterations may be made in these exemplifying drawings, within the scope of the appended claim without departing from the principles of the invention.

Figure 1 is a central, vertical, sectional view of a conventionalized reflex camera having a foldable focusing hood mounted thereon by means of an attaching frame, the hood being in operative position, and the dot and dash lines showing the angles of incidence and reflection.

Figure 2 is a view similar to Figure 1, but showing a non-foldable focusing hood forming part of the attaching frame that is fastened to the specially constructed top portion of the camera body or light chamber.

Figure 3 is an enlarged detail, side view of the slide bolt or flat bar employed for locking the hood on the camera, which locking bar or bolt is permanently mounted on the top of the camera body, for co-action with the interchangeable hoods.

Figure 4 is a front view of the non-folding focusing hood of Figure 2, looking to the left, and showing the locking bar in dotted lines in engagement with both the hood and the camera.

Figure 5 is a detached, sectional view of the attaching frame for the folding hood.

Figure 6 is a sectional view showing the structure at the top of the camera which is complementary to the frame of Figure 5.

Figure 7 is a top plan view of the camera showing the lock bolt mounted therein.

Figure 8 is an enlarged sectional detail view illustrating one method of fastening the lock bar to the camera body, as shown in Figure 2.

In order to illustrate the general assembly and relation of parts, Figures 1 and 2 illustrate conventional reflex cameras, one equipped with a foldable focusing hood, and the other equipped with a non-folding hood, the two hoods being interchangeable for use on the cameras. In each of these figures of drawing the body 1 of the camera forms a light chamber 2, and the photographic lens 3 is mounted at the front of the camera. At the rear of the camera in a dark chamber the roll film 4, and the focal shutter 5 are arranged back of the aperture 6, and an automatic operating reflecting mirror 7 is mounted in the light chamber and hinged at 8, so that it may be swung from focusing position as shown, to a horizontal position to exclude light from above when an exposure is to be made.

In Figure 1 the ground glass plate 9 used as a focusing screen is mounted in an attaching frame 10 of rectangular shape, and the foldable focusing hood mounted thereon has its four plates hinged thereto as at 11. The hinged front coverplate 12 of the hood is flanged, and folds down to cover the back plate 13 and the two side plates 14. The plate 15, which is hinged on the same axis as the cover plate, is provided with a magnifying glass or finder lens 16 and shown in position for focusing the image on the underside of the ground glass screen 9. As indicated by the curved dotted lines the plate 15 is swung upwardly from focusing position so that the setting of the finder lens 16 fits into an opening 17 of the cover plate, before the back and side plates are closed, and then the cover plate 12 with the plate 15 is turned down to close the hood. Suitable hinge springs are employed to automatically open or unfold the hood, after the cover plate 12 has been released, as by a spring catch, but as these parts do not form essential parts of the present invention they are not here illustrated.

In Figure 2 a non-folding type of hood is illustrated as a whole by the numeral 18, and one eye is used with the magnifying glass or finder lens 19 in focusing. This hood has a reflecting mirror 20 for co-operation with the ground glass plate or focusing screen 21, which as shown is mounted in the top of the camera to receive the image from the hinged mirror 7 in the light chamber 2. In this type of hood, in lieu of the frame 10 of Figure 1, the side walls, the front wall 22, and the rear wall 23 of the hood form the attaching frame for mounting the removable hood on the body of the camera.

Thus in Figures 1 and 2 two forms of attaching "frames" 10 and 22—23 are employed by means of which the two different hoods (and other interchangeable hoods) may be selectively attached to the same camera.

For adapting the camera for this interchangeable use of hoods, the upper central top portion of the camera is provided with a single exterior, rear flange 24 extending transversely of the optical axis of the camera, and this flange is provided with two rearwardly extending, spaced pins 25.

At the front of the camera and parallel with the rear flange are fashioned two flanges 26 and 27 which are spaced apart to form an open groove 28. As best seen in Figure 8 two threaded studs 29 are fixed in the flange 26 and they project transversely across the slot 28 into complementary transverse holes 30 in the front flange 27, and each of these threaded studs is provided with a clamp nut 31 which fit into the holes and are threaded on the studs 29.

Referring to the attaching frame 10 in Figure 5 it will be seen that the frame has a depending rear flange 32 with transversely extending holes 33 which fit over the two pins 25 of the rear body flange 24. The front wall of the frame 10 has two parallel spaced flanges 34 and 35 forming a groove 36, and these flanges 34, 35 rest upon the complementary flanges 26 and 27 of the camera body. The two matching grooves 28 and 36 together form a slot in which a locking slide bar 37 is mounted for use in locking the hood on the camera.

As best seen in Figure 3, the locking bar 37 has two longitudinally extending slots 38 near its ends to accommodate the studs 29, and an angular, exterior handle 39. The central portion 40 of the slide bar 37 is extended or increased in height to the full height of the slot in which the bar is located. Another longitudinally extending slot 41 is fashioned in this extension of the bar, and the slot is provided with an open angular mouth 42 opening through the upper edge of the flat bar. The mouth 42 and slot 41 are adapted to co-act with a headed pin 43 in the nature of a latch fastening, and this headed pin 43 in Figure 1 extends transversely of and is fixed in the flanges 34 and 35; while in Figure 2 the pin 43 is fixed in the front framewall 22 of the hood.

In attaching a hood on the camera the sliding lock bar is first pulled out to the limit of the slots 38 and pins 29; then the holes 33 are slipped over pins 25; the front of the hood is then lowered to slip pin 43 through mouth 42 of the slot 41. After the hood is in place, the lock bar is slid to position of Figure 4 to engage pin 43 in slot 41, and then the nuts 31 are threaded on the studs 29 against the lock bar, to hold the latter firmly in place. In detaching a hood, the nuts 31 are first released to free the lock bar; the bar is then slid to the left in Figure 4 bringing the mouth 42 of the bar into position so that the pin 43 will pass upwardly through the mouth when the front of the hood is lifted slightly, and with this slight lifting of the front of the hood, the rear flange of the hood is slipped off the retaining pins 25.

Other means or devices may be employed for attaching and locking a hood on the top of the camera, and such means or devices are included within the scope of the following claim.

I claim:

Attaching means for a detachable camera hood comprising a pair of spaced pins extending from one wall of the hood and adapted to engage openings in the camera, spaced flanges on the camera forming a groove, spaced flanges on the hood forming a groove, a latching pin extending across said hood groove, a latching plate slidably secured in said camera groove and said plate having a central upwardly extending portion formed with a bayonet slot therein adapted to co-operate with said latching pin, and means for moving the plate to pin engaging or disengaging position.

KARL NÜCHTERLEIN.